Oct. 14, 1952          H. J. BUTLER          2,613,765
BRAKE
Filed June 1, 1949                                             4 Sheets-Sheet 1
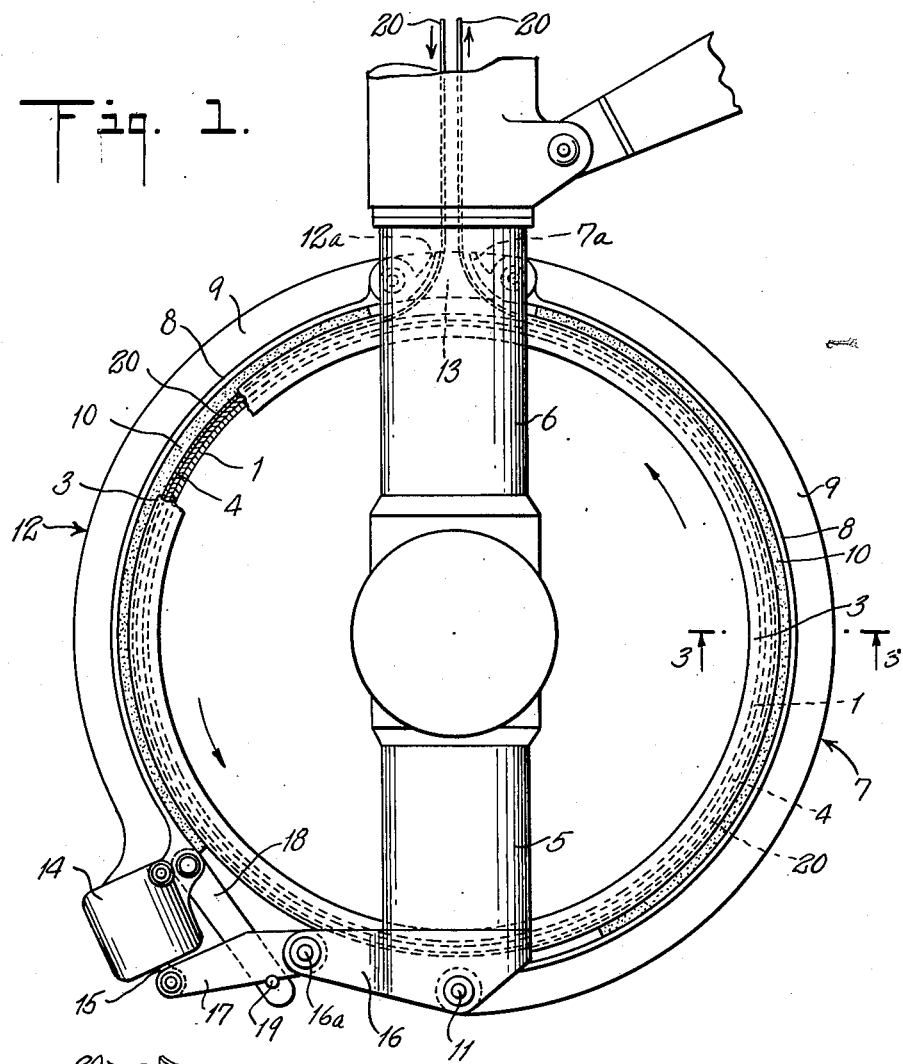
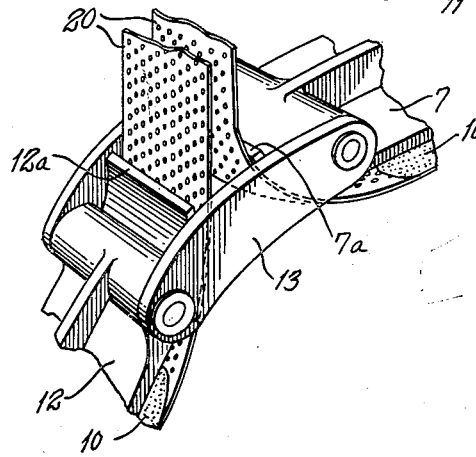
INVENTOR.
HENRY JAMES BUTLER
BY Benj. T. Rauber
ATTORNEY Oct. 14, 1952 H. J. BUTLER 2,613,765
BRAKE
Filed June 1, 1949 4 Sheets-Sheet 2
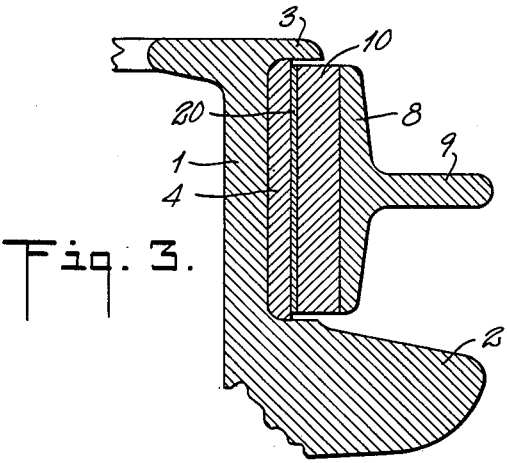
Fig. 3.
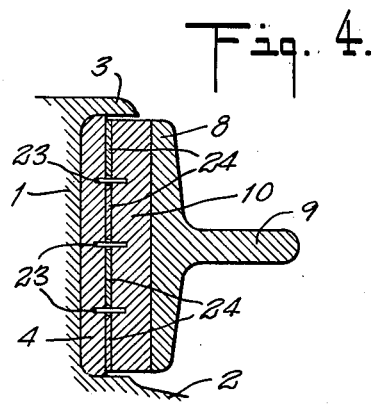
Fig. 4.
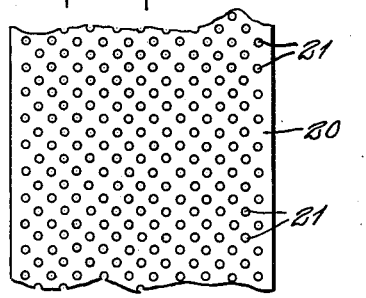
Fig. 5.
Fig. 5A.
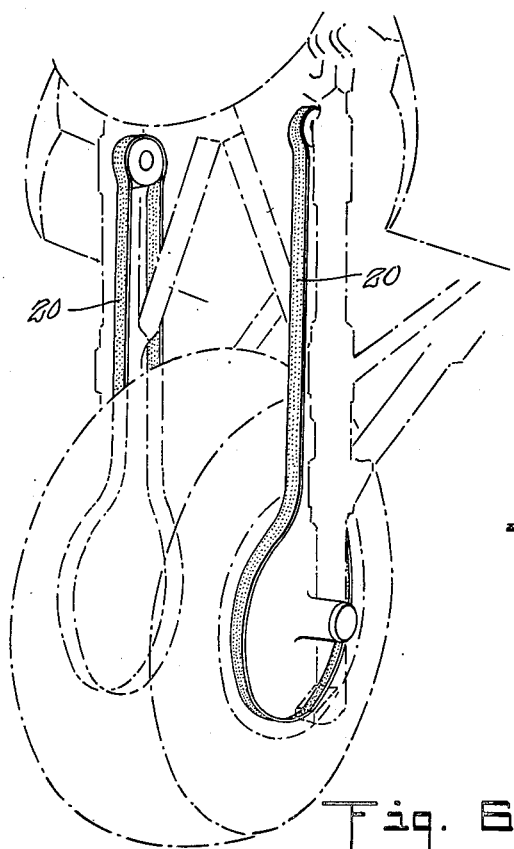
Fig. 6.
INVENTOR.
HENRY JAMES BUTLER
BY
Benj. T. Rauber
ATTORNEY Oct. 14, 1952     H. J. BUTLER     2,613,765
BRAKE Filed June 1, 1949     4 Sheets-Sheet 3

INVENTOR.
HENRY JAMES BUTLER
BY
Benj. T. Rauber
ATTORNEY

Oct. 14, 1952     H. J. BUTLER     2,613,765
BRAKE

Filed June 1, 1949     4 Sheets-Sheet 4

INVENTOR.
HENRY JAMES BUTLER
BY Benj. T. Rauber
ATTORNEY

Patented Oct. 14, 1952

2,613,765

UNITED STATES PATENT OFFICE 2,613,765

BRAKE

Henry James Butler, Sutton Coldfield, England, assignor to Dunlop Rubber Company Limited, London, England, a British company Application June 1, 1949, Serial No. 96,425
In Great Britain June 4, 1948

17 Claims. (Cl. 188—75)

This invention relates to brakes, particularly brakes required to absorb a large amount of energy in a short time, such as are employed on aircraft.

The weight and high landing speeds of modern aircraft and the large amount of heat energy which is generated rapidly during braking has presented brake designers with problems of great complexity.

Both disc and drum type brakes are known and are in common usage. Disc brakes essentially consist of one or more discs rotatable with the wheel, non-rotatable friction members disposed on each side of the disc at one or more locations around its periphery and a mechanism for forcing the members into frictional engagement with the disc or discs. Drum brakes comprise a metal drum rotatable with the wheel, one or more non-rotatable arcuate friction members adjacent the drum and means for moving said members into frictional engagement with the drum. The friction members may be positioned either inside or outside the drum and are moved respectively outwardly or inwardly for braking purposes.

If such brakes are to operate efficiently it is essential that they should not be heated above a certain maximum temperature, which varies with the material used in their construction. If this temperature is exceeded superficial fusion of the braking surfaces may occur. The coefficient of friction between those surfaces and that of the friction members then decreases and what is known as "brake fade" results. In addition, charring of the friction members may occur, owing to decomposition of organic binders which are present.

There are two methods of preventing an undue rise of temperature in the brakes. One is to provide a large mass of material of high specific heat and the other is to dissipate the heat absorbed as quickly as possible. Both methods have been and are employed, but the mass of material permissible is governed by the weight factor, and also to some extent by the size of the brake surfaces, both of which should be kept as low as possible, particularly in aircraft brakes, since reduction in weight is of primary importance in aircraft.

The rate of dissipation of heat also cannot be increased indefinitely. The dimensions of the brake members must be kept within reasonable limits and hence their maximum surface/volume ratio, which is one of the factors controlling the rate of heat dissipation, is limited. Moreover, a further difficulty which arises is that during braking heat may be generated so rapidly that it cannot be conducted away from the contacting brake surfaces sufficiently fast, so that their temperature will build up, even though the opposite surfaces of the brake members are relatively cool.

It is the object of this invention to provide improved drum brakes which are lighter in weight than known brakes of equal braking power and in which the maximum temperature attained by the brake members is considerably lower than that which is at present usual.

According to the invention a drum brake comprises a metal drum rotatable with a wheel, braking means comprising a non-rotatable friction member, means for moving said friction member towards the drum and an endless belt having a portion interposed between the drum and the friction member and a portion not in contact with the drum, said belt being adapted to be driven by the drum during the braking operation whereby the belt is adapted to be cooled when not in contact with the drum. Preferably the endless belt is made of a metal of high thermal conductivity.

The drum surface and the surface of the band which contacts therewith are such that the driving force between said surfaces is much greater than that between the contacting surfaces of the band and friction member. Consequently there is little or no slip between the drum surface and the contacting surface of the band, and little or no heat is generated at these surfaces. A further consequence is that there is but little tension on the band and it can therefore be light in construction.

In order to increase the driving force between the drum and the band the surface of the drum may be knurled or otherwise roughened, or provided with small projections which are radially disposed to engage the band. Preferably, however, the drum is provided with an annular covering of bonded asbestos secured to the surface adjacent the band, and the band is a perforated metal strip, the perforations being provided with "burrs" which stand out at one side of the strip. The band is inserted with the "burrs" engaging with the asbestos covering of the drum and providing the driving force, the friction members then engaging with the smooth side of the band.

As the band moves with a speed substantially that of the periphery of the drum any portion of the band is in continuous contact with a friction member for only a very short time, after which it is enabled to cool down before it returns into contact with the friction member. The brake can therefore be so designed that the heat absorbed during such contact is dissipated during the cooling portion of the band's travel and the band is substantially at atmospheric temperature each time that it passes into contact with the braking means.

A brake constructed in accordance with the invention can be appreciably lighter than a conventional type brake in which the heat is absorbed into the friction elements. The drum, for example, may be made of a light metal and, as it need not have a high thermal capacity, its thickness can be considerably less than a normal steel drum. The weight of the band is small. Moreover the brake-applying mechanisms are less complicated and lighter in this new construction, thus effecting still further economies in weight.

Yet a further advantage of this brake construction lies in the fact that since the friction elements are rapidly cooled the brakes may be applied at short intervals without damage. This fact is of great benefit in pilot training, for air-taxis, and charter aircraft or the like with only a short distance between stops, since previously the "build-up" of heat in the friction members of the brakes restricted the number of landings in any stipulated period.

In order that the invention may be more fully described, reference is made to the accompanying drawings, in which:

Figure 1 is a side view of a brake construction in accordance with one embodiment of the invention.

Figure 2 is a perspective sketch of part of Figure 1.

Figure 3 is an enlarged section through 3—3 of Figure 1 looking in the direction of the arrows.

Figure 4 is an alternative section through 3—3 of Figure 1.

Figures 5 and 5a are two views of a portion of endless band.

Figure 6 is a perspective sketch of an aeroplane undercarriage indicating disposition of brake bands.

Figure 7:
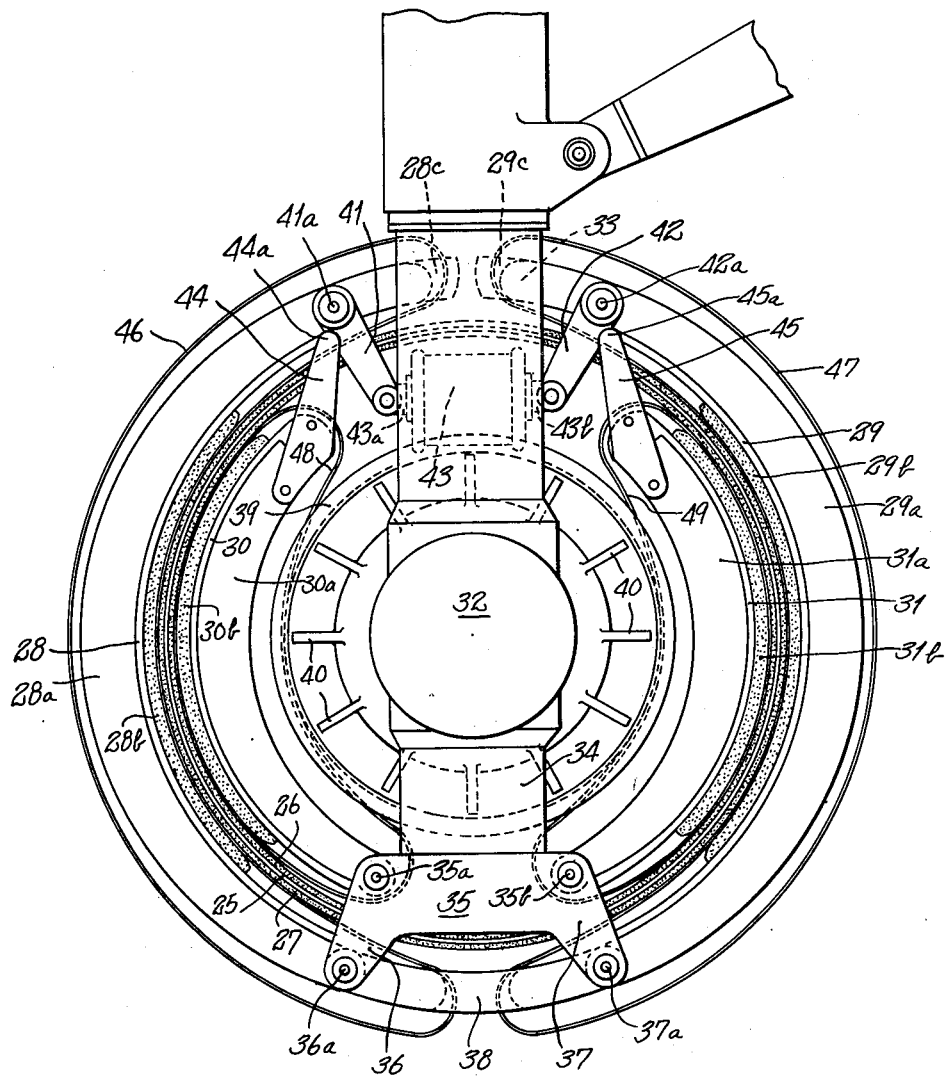
Figure 7 is a side view of a brake construction in accordance with another embodiment of the invention.

In one embodiment of the invention, Figures 1, 2, 3, 5 and 6, an aircraft brake comprises a drum 1 forming an extension of a wheel rim 2 and extending axially therefrom for a distance of approximately one inch, where it terminates in an outwardly extending radial flange 3. Secured to the outer periphery of the drum by soft rivets or the like is a bonded asbestos covering 4 extending axially from the rim to the flange.

Secured to the non-rotatable axle of the wheel is a member 5, which may conveniently be an extension to the oleo-strut 6 of the aircraft, as is illustrated in Figure 1, and this member extends downwardly from the axle to a location adjacent the drum. A brake shoe 7 is provided, comprising a metal member 8 concentric with the asbestos covered drum and having on its outer peripheral face a circumferentially-extending strengthening rib 9. A pad of friction material 10 is secured to its inner peripheral face. The shoe extends over substantially half the periphery of the drum and one end of the shoe is pivotally secured to the member 5 by a pin 11 passing through a hole in the member and the shoe.

Another brake shoe 12, similar to the shoe 7, but having a length of only approximately one third the periphery of the drum, is secured by means of a gate link 13 (Figure 2) to the free end of the brake shoe 7. Said gate link comprises two arcuate metal links which are pivotally secured on each side of adjacent ends of brake shoes 7 and 12. The said ends of the shoes are formed with portions 7a and 12a curving outwardly for a purpose to be later described, and a rectangular gap is provided between the links and the ends of the shoes.

At the end of the brake shoe 12 remote from the gate link and integral with the shoe is a cylinder 14 provided with a connection for pressure fluid. The cylinder is disposed with its open end remote from the shoe, the longitudinal axis of the cylinder being substantially tangential to its associated end of the shoe. A piston (not illustrated) is slidably fitted in the cylinder, and an associated piston rod 15 projects outwardly from the open end thereof. The member 5 extending from the axle is provided with an arm 16 presented towards the cylinder and a link 17 is pivotally attached at one end by a pin 16a to the end of the arm 16 and at the other end to the end of the piston rod. Pivotally secured to the end of the brake shoe 12, adjacent the cylinder and substantially in line with the longitudinal axis thereof, is another link 18, the end of which is provided with a peg 19 which fits into a corresponding recess in the edge of the link 17 remote from the cylinder and adjacent the end of the pin 16a.

An endless metal band 20 having a high thermal conductivity and a hard chromium plated finish is provided. The band is perforated, Figures 5, 5a, and the edges of the perforations 21 are provided with burrs 22 which stand proud from one face of the band. The band may be, e. g. 1 inch wide and 0.01 inch thick, and the burrs stand proud 0.005 inch on one side. The band is inserted between the asbestos covering secured to the drum and the friction pads, with the burrs standing out from the band biting into the asbestos. The length of the band is considerably in excess of the periphery of the drum, and the free loop of band thus formed is led through the gate link, up one side of the oleo strut and is passed over a guide or runner secured to the end of a member solid with the inner member of the oleo strut (Figure 6). Thus deflection of the oleo strut on landing will not affect the tension of the band.

In operation pressure fluid is passed into the cylinder and forces the piston outwardly. The outward movement of the piston rod causes the link 17 to pivot about the link 16a, which in turn exerts a pull on link 18. This tends to move the brake shoe 12 circumferentially around the wheel and, acting through the gate link, causes the brake shoe to pivot about the pin 11 towards the drum. The general effect is to cause the friction pads associated with the shoes to move into tight frictional contact with the metal band. The metal band is driven by the drum, by the burrs on the band engaging with the asbestos covering on the drum, and passes round the drum, up the oleo strut, round the guide at the top of the strut and back down the strut to the drum. Frictional contact between the friction pads and the band causes the band to heat up, but as the heated band emerges from the drum and passes up the oleo strut, the air from the slipstream cools it, and by the time it re-enters the drum it is practically at ambient temperature. Thus the friction pads can also be maintained at a constantly low temperature during the braking operation. The asbestos covering, whilst also serving to drive the band, prevents heat from passing to the drum, which can therefore be very thin, of the order of 1/8 inch.

Preferably the aircraft wheel is provided with a drum brake, as herein described, on each side of the wheel, see Figure 6. The belts may extend to the top of the oleo strut, as illustrated in Figure 6, or they may extend, e. g. along the bottom of the aircraft fuselage, so that enhanced cooling is obtained. A light shield may be provided to prevent dust and dirt from passing into the braking mechanism or on to the metal bands.

To prevent failure of the brake due to fracture of the metal band, a number of bands of less width in side by side relationship may be provided. Such a construction is shown in section in Figure 4. Three annular metal members 23 are set on edge in the bonded asbestos strip 4, and project radially outwards a short distance therefrom, complementary circumferential grooves being provided in the friction pads, and four bands 24, having a width of, e. g., 1/4 inch, are fitted between the members, the members thus preventing axial movement of the bands. Thus if one band should fail the brake would still be operable on the remaining three bands.

In another embodiment of the invention, illustrated in Figure 7, an aircraft wheel is provided with an axially-extending drum 25 situated between the rim and the hub of the wheel and rotatable with the wheel. Secured to the inner periphery of said drum is a bonded asbestos covering 26, and a bonded asbestos covering 27 is secured to the outer periphery of the drum.

Two outer brake shoes 28 and 29 are provided, each of which extends substantially over half the outer periphery of the drum. Each shoe has a circumferentially-extending strengthening rib 28a and 29a on the outer peripheral face and a pad of friction material 28b and 29b secured to the inner face. Two inner brake shoes 30 and 31 are also provided each extending substantially over one quarter the inner periphery of the drum, each with a strengthening rib 30a and 31a on its inner peripheral face and a pad of friction material 30b and 31b on its outer face.

The non-rotatable axle 32 of the wheel is attached to an oleo-strut 33 and attached to the end of the strut adjacent the axle is a tubular extension 34 coaxial with said strut and terminating, at a location adjacent the drum, in a bracket 35. Said bracket is provided with two arms 36 and 37 extending substantially radially from the ends thereof. The inner shoes 30 and 31 are pivotally attached to the bracket 35 by pins 35a and 35b passing through said bracket and the ends of the shoes. The outer shoes 28 and 29 are similarly pivotally attached at a location adjacent their ends to the ends of the arms 36 and 37 by pins 36a and 37a. A gate link 38, similar to that described in the previous embodiment, is interposed between the ends of arms 36 and 37, and the ends of the ribs 28a and 29a remote from the gate links are thickened and formed with bifurcated portions 28c, 29c to locate the bands and prevent axial movement thereof relative to the shoes.

The rotating hub of the wheel, on that side of the wheel provided with the drum, is provided with a pair of radially-extending flanges 39 spaced axially apart, and a plurality of radially-extending vanes 40, also integral with the hub, are adapted to deflect air across the braking surfaces for cooling purposes when the wheel rotates.

From a location on the side of each of the outer brake shoes and adjacent the end remote from the gate link, an operating lever extends radially towards the centre of the wheel. Said two levers 41 and 42 are pivotable about pins 41a and 42a projecting from the sides of said shoes and at their ends remote from said shoes are pivotably attached to the ends of two piston rods 43a and 43b which are associated with opposed pistons (not shown) slidably fitting in a cylinder 43 provided with a connection for pressure fluid. Rigidly secured to the inner brake shoes 30, 31, at that end remote from the bracket 35 are two pressure arms 44, 45 one to each shoe. Each arm terminates in a cam surface 44a, 45a, adapted to abut against the edge of an associated operating lever 41, 42 at a location adjacent the pivoting point 41a, 42a.

Four perforated endless metal bands, similar to that described in the first embodiment, are provided, one being associated with each of the outer brake shoes and one with each of the inner shoes. The bands 46, 47, associated with the outer shoes pass between the asbestos covering 27 secured to the outer periphery of the drum and the friction pads associated with the outer shoes, the burrs standing out on one side of the band "biting" into the asbestos covering. The bands pass through the gate link 38, around the outer periphery of the shoes and between the side walls 28c and 29c. The bands 48 and 49, associated with the inner shoes pass between the asbestos covering 26 and the friction pads associated with the inner shoes and round the inner periphery of the inner shoes, where it is located in the channel formed by the two axially-spaced flanges 39 extending radially from the hub.

To operate the brakes the pilot allows pressure fluid to pass into cylinder 43 between the opposing end faces of the pistons slidably fitted therein. The pistons are thus forced mutually away from each other, moving the associated piston rods outwardly of each end of the cylinder. The operating levers 41 and 42 are thus forced to swing about their pivots 41a and 42a, and in so doing force the pressure arms radially outwards. This causes the inner shoes to swing outwardly about their pivots 35a and 35b and forces the pads associated with said shoes into frictional contact with the associated metal bands 48, 49. Simultaneous with this action, the cam surfaces 44a, 45a are acting as fulcrums about which the operating levers 41, 42 pivot, and this causes the outer shoes to swing inwardly about their pivots 36a, 37a, so forcing the friction pads associated with said shoes into contact with the metal bands 46, 47. As the bands are forced against the asbestos covering, the burrs engage with the covering and hence the bands rotate with the drum. The bands are heated by frictional contact with the pads, but, moving out of contact with the pads, pass round the brake shoe before re-engaging with the pads. During the period of non-engagement the bands are cooled by contact with the air, aided by the air blast set up by the rotating vanes on the hub, and are practically at ambient temperature by the time that they have returned into frictional contact with the pads.

Figure 8:
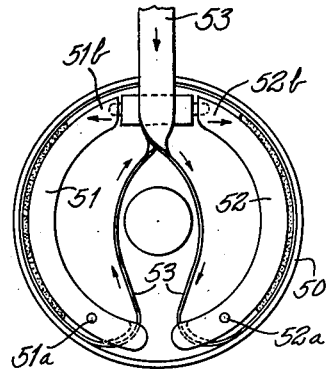
Figures 8–15 are diagrammatic views of alternative constructions.
Figure 9:
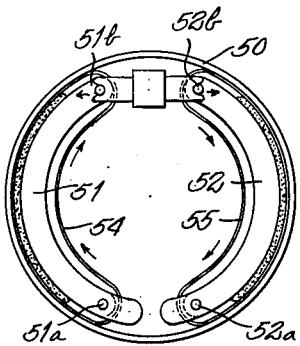
Figure 10:
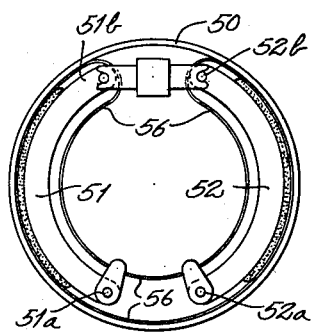
Figure 11:
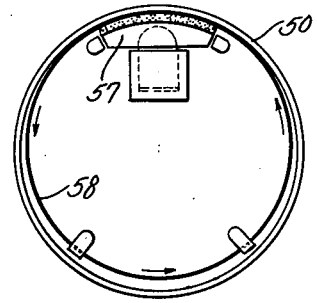

Other embodiments of this invention are illustrated diagrammatically in Figures 8 to 15 inclusive. In Figures 8, 9 and 10 the brake shoes 51, 52 carrying pads of friction material are disposed within the drum 50 and are adapted to pivot outwardly about one end 51a, 52a, under the action of a fluid-pressure operated mechanism (not illustrated) interposed between the outer ends 51b, 52b. In Figure 8 the brake band 53 passes between the shoes and the drum, on each side of the hub and thence up the oleo strut. In Figure 9 two bands 54, 55 are provided, each encircling a brake shoe, and in Figure 10 a single band 56 passes between both shoes and the drum and is then taken round the hub of the wheel. Figure 11 shows a shoe 57 adapted to move radially outwards towards the drum 50 and having an associated metal band 58 of smaller periphery than said drum periphery.

Figure 12:
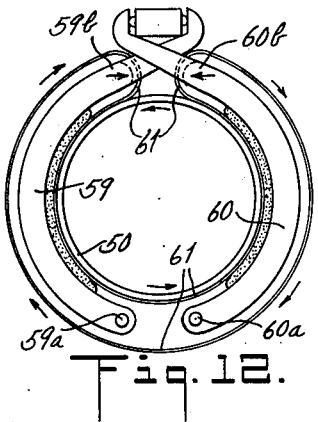
Figure 13:
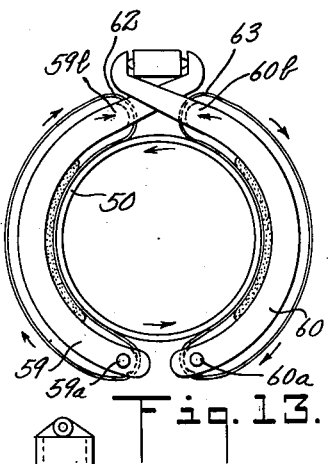
Figure 14:
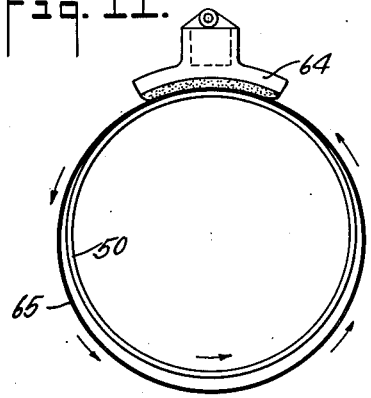
Figure 15:
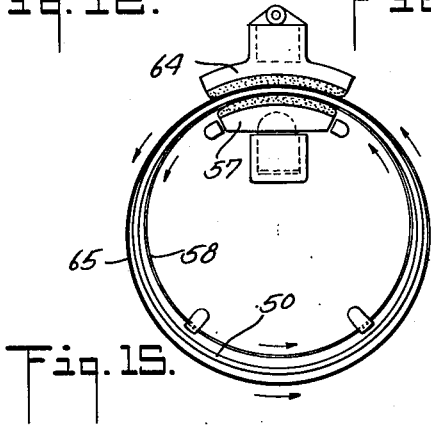

In Figures 12 and 13 the brake shoes 59, 60, are disposed outside the drum 50 and are adapted to pivot inwardly about one end 59a, 60a, under the action of a fluid-pressure operated mechanism interposed between the other ends 59b, 60b. In Figure 12 a single band 61 passes between the shoes and the drum and round the outer periphery of the drum and in Figure 13 two bands 62 and 63 are employed, each passing round the periphery of a shoe. Figure 14 illustrates a brake shoe 64 adapted to move radially inwards towards the drum 50 and an associated metal band 65 of greater periphery than the periphery of the drum. Figure 15 shows a combination of Figures 11 and 14.

Two brakes in accordance with the invention may be coupled together in tandem. For example, in a four-wheeled landing bogie for a heavy aircraft the wheels are provided with drums extending axially beyond the rims and endless metal belts passing round the drums connect the drums at the same side of the bogie. Brake shoes are adapted to frictionally contact the bands at their line of contact with the drums, and the bands, when heated by said frictional contact, are speedily cooled in the air stream between the wheels.

Instead of a metal band, as herein described, the rotatable braking element may comprise a fabric belt made of cotton or a mixture of cotton or asbestos having transverse strips of steel, copper or other metal or metal gauze fixed to the side adjacent to the friction pads, or it may consist of a number of endless metal wires arranged side by side in the form of a warp. Alternatively the element may consist of a metal gauze, or one or more belts which may be of the V type.

Having described my invention what I claim is:

1. A drum brake comprising a wheel, a metal drum rotatable with said wheel, braking means comprising a non-rotatable friction member, means for moving said friction member towards the drum and an endless belt of heat conductive material having a portion interposed between the drum and the friction member, and driven by rotation of the drum during a braking operation and having a further portion free from contact with the drum and friction member, whereby heat generated on braking is dissipated into the atmosphere as the belt moves out of engagement with the friction member.

2. The drum brake of claim 1 comprising guides remote from said drum and in which the endless belt encircles the drum and is passed around said guides.

3. The drum brake of claim 1 having a bonded asbestos covering secured to the surface of the drum co-acting with the friction member and in which the endless belt is of perforated metal, said perforations having burrs extending from one side to engage said asbestos covering.

4. A drum brake comprising a wheel, a brake drum rotatable with said wheel, two friction members and associated brake shoes located exteriorly of said drum and movable inwardly towards said drum, two friction members and associated shoes located interiorly of said drum and movable outwardly towards said drum, four endless belts of heat conductive material each belt passing around a brake shoe and associated friction member and having a portion interposed between said shoe and the brake drum and rotatable with the drum during braking and an operating means for simultaneously forcing the brake shoes against said drum.

5. The drum brake of claim 4 having a bonded asbestos covering secured to the surface of the drum co-acting with the friction members and wherein the endless belt is of perforated metal, said perforations being provided with burrs extending on one side thereof to engage with said asbestos covering.

6. A brake drum comprising a wheel, a metal drum rotatable with said wheel, braking means comprising a non-rotatable friction member movable towards and from said drum and a series of endless belts of heat conductive material arranged in side by side relationship having a portion interposed between the drum and the friction member and a portion free from the exterior of said drum and friction member and exposed to the atmosphere, said drum having radial extensions between said belts to prevent axial displacement said endless belt being driven by rotation of the drum during a braking operation to bring successive portions between said drum and said friction member and thence into contact with the atmosphere.

7. The drum brake of claim 6 having a bonded asbestos covering secured to said drum and in which said endless belt has projections engaging said asbestos covering.

8. The drum brake of claim 6 having guides for the portion of said endless belt not in contact with said friction member and drum.

9. A drum brake comprising a wheel, a metal drum rotatable with said wheel, braking means comprising a non-rotatable friction member movable towards and from said drum and a series of endless belts of heat conductive material arranged side by side and each having a portion interposed between said drum and friction member and driven by rotation of the drum during a braking operation and having a portion exposed to the atmosphere outside of said drum and said friction member.

10. A drum brake comprising a wheel, a metal drum rotatable with said wheel, braking means comprising a pair of non-rotatable friction members movable towards said drum and an endless belt of heat conductive material having a portion passing between said drum and said friction members and thence outwardly into contact with the atmosphere and thence returning to position between said drum and friction members.

11. A vehicle drum brake comprising a wheel, a metal drum rotatable with the wheel, braking means comprising a non-rotatable friction member, means for moving the friction member towards the drum and an endless belt of heat conductive material which has a portion interposed between the drum and the friction member and is driven by rotation of the drum during a braking operation and has a further portion free from contact with the drum and friction member whereby heat generated on braking is dissipated into the atmosphere as the belt moves out of engagement with the friction member and the brake drum.

12. The drum brake of claim 11 comprising guides remote from the drum and in which the endless belt encircles the drum and is passed around the guides.

13. The drum brake of claim 11 having a bonded asbestos covering secured to the surface of the drum co-acting with the friction member and in which the endless belt is of perforated metal, the perforations having burrs extending from one side to engage the asbestos covering.

14. A vehicle drum brake comprising a wheel, a brake drum rotatable with the wheel, two friction members and associated brake shoes located outside the drum and movable inwardly towards the drum, two friction members and associated shoes located inside the drum and movable outwardly towards the drum, four endless belts of heat conductive material each belt passing around a brake shoe and associated friction member and having a portion interposed between the shoe and the brake drum and rotatable with the drum during a braking operation and an operating means for simultaneously forcing the brake shoes towards one another such that the brake shoes outside the drum move inwardly towards the drum and the brake shoes inside of the drum move outwardly towards the drum.

15. The drum brake of claim 14 having bonded asbestos covering secured to the inner and outer surfaces of the drum co-acting with the friction members and wherein the endless belts are of perforated metal, the perforations being provided with burrs extending on one side thereof to engage with the asbestos coverings.

16. A drum brake comprising a wheel, a metal drum rotatable with the wheel, braking means comprising a non-rotatable friction member movable towards and away from the drum and a series of endless belts of heat conductive material which are arranged in side by side relationship, each belt having a portion interposed between the drum and friction member and axial movement of the belts being prevented by annular radially-extending members secured to an exterior surface of the drum, the belts being driven by rotation of the drum during a braking operation and each having a portion exposed to the atmosphere outside the drum and friction member.

17. The drum brake of claim 16 having a series of annular radially extending members secured to the exterior surface of the drum, each member separating one endless belt from the belt lying adjacent to it and wherein complementary circumferential grooves are provided in the friction member which engage with the radially extending members of the drum.

HENRY JAMES BUTLER.

REFERENCES CITED

The following references are of record in the file of this patent:

UNITED STATES PATENTS

| Number | Name | Date |
|---|---|---|
| 998,979 | O'Doherty | July 25, 1911 |
| 2,003,569 | Wood | June 4, 1935 |
| 2,364,201 | Fankhoner | Dec. 5, 1944 |